United States Patent [19]

Akitaya et al.

[11] Patent Number: 4,966,931

[45] Date of Patent: Oct. 30, 1990

[54] FLAME-RETARDANT POLYPROPYLENE RESIN COMPOSITION

[75] Inventors: Shinichi Akitaya; Toru Fukazawa; Yutaka Nozokido; Nobuchika Tabata, all of Chiba, Japan

[73] Assignee: Chisso Corporation, Japan

[21] Appl. No.: 298,951

[22] Filed: Jan. 19, 1989

[30] Foreign Application Priority Data

Jan. 29, 1988 [JP] Japan .................................. 63-19298
May 2, 1988 [JP] Japan ................................ 63-109537

[51] Int. Cl.$^5$ .................. C08K 5/349; C08K 5/15; C08K 5/51
[52] U.S. Cl. .................................... 524/100; 524/120; 524/121; 524/146; 524/416; 524/97; 524/516
[58] Field of Search ............... 524/100, 120, 121, 146, 524/416, 97, 516; 525/326.7, 333.7, 374

[56] References Cited

U.S. PATENT DOCUMENTS

| | | | |
|---|---|---|---|
| 3,039,993 | 6/1962 | Friedman | 524/120 |
| 3,573,251 | 3/1971 | Salvatore et al. | 524/120 |
| 4,154,718 | 5/1979 | Miyata et al. | 524/408 |
| 4,234,469 | 11/1980 | Ohta et al. | 524/411 |
| 4,396,730 | 8/1983 | Imahashi | 524/394 |
| 4,504,610 | 3/1985 | Fontanelli et al. | 524/96 |
| 4,615,831 | 10/1986 | Kanno et al. | 428/921 |

FOREIGN PATENT DOCUMENTS

| | | | |
|---|---|---|---|
| 0209679 | 1/1987 | European Pat. Off. | 524/120 |
| 53-92855 | 8/1978 | Japan . | |
| 54-77658 | 6/1979 | Japan . | |
| 56-26954 | 3/1981 | Japan . | |
| 3182354 | 7/1988 | Japan | 524/134 |

OTHER PUBLICATIONS

O. Cicchetti et al., "Advances in the Field of Intumescent Halogen-Free Flame Retardants for Polymers", 2nd International Conference-Flame Retardants, Nov., 1985.

*Primary Examiner*—Kriellion Morgan
*Attorney, Agent, or Firm*—Leydig, Voit & Mayer

[57] ABSTRACT

The present invention disclosed herein is connected with a polypropylene resin composition giving off no corrosive and poisonous gases, having excellent moldability, providing molded articles with excellent mechanical strength and high flame retardance. The composition of the present invention is composed of predetermined amounts of a polypropylene resin, a polyethylene resin, polyammonium phosphate or polyammonium phosphate modified by melamine resin and a 1,3,5-triazine derivative. This composition may additionally contain a predetermined amount of one or more of specific thiophosphites and may further contain a predetermined amount of an olefinic synthetic rubber or elastomer and a crosslinking agent.

18 Claims, No Drawings

FLAME-RETARDANT POLYPROPYLENE RESIN COMPOSITION

BACKGROUND OF THE INVENTION

1. Field of the Invention

The present invention relates to a flame-retardant polypropylene resin composition. More specifically, it relates to a flame-retardant polypropylene resin composition mainly comprising a polypropylene resin, giving off neither a corrosive gas nor a poisonous gas, keeping up good processability, and providing molded articles in which mechanical strength is stable and flame retardance is excellent.

2. Description of the Prior Art

Heretofore, polypropylene resins were often used in the field of household electric appliances and in other fields of buildings, interior decorations, automobile parts and the like, because of excellent processability, chemical resistance, weathering resistance, electrical properties and mechanical strength.

Originally, the polypropylene resins had the potential to burn, but with the expansion of their use applications, performance as flame-retardant materials was required for the polypropylene resins, and the performance level under demand has heightened year by year. In order to meet this demand, a variety of flame-retardant polypropylene resin compositions have been suggested.

For example, Japanese Patent Laid-open Publication Nos. 92855/1978, 29350/1979, 77658/1979, 26954/1981, 87462/1982 and 110738/1985 disclose compositions prepared by adding, to polypropylene resins, hydrous inorganic compounds (e.g., magnesium hydroxide, aluminum hydroxide, barium sulfate, magnesium oxide, oxides of antimony, hydrotalcite and the like); Japanese Patent Publication No. 30739/1980 discloses a composition prepared by adding, to a polypropylene resin, a polyethylene having a melt index of 0.01 to 2.0, decabromo diphenyl ether (or dodecachlorododecahydromethanodibenzocyclooctene) and at least one inorganic filler selected from the group consisting of powdery talc, kaolinite, sericite, silica and diatomaceous earth; and Japanese Patent Laid-open Publication No. 147050/1984 discloses a composition prepared by adding ammonium phosphate (or phosphoric acid amine) and the oligomer (or polymer) of a 1,3,5-triazine derivative to a polypropylene resin.

However, in the composition prepared by adding a hydrous inorganic compound, for example, magnesium hydroxide to a polypropylene resin, a great deal of the hydrous inorganic compound must be added thereto in order to obtain high flame retardance. As a result, the moldability of the composition deteriorates, and products manufactured by molding the composition are poor in mechanical strength.

Furthermore, the composition containing a halogen compound inconveniently gives off a corrosive gas and a poisonous gas, when processed and burnt, though moldability is not so bad and molded articles of this composition have suitable mechanical strength and high-level flame retardance.

The above-mentioned flame-retardant polypropylene resin composition disclosed in Japanese Patent Laid-open Publication No. 147050/1984 has good moldability and gives off a lower volume of corrosive and poisonous gases when processed and burnt, and molded articles of this composition have suitable mechanical strength.

However, according to a test corresponding to a vertical burning test in "Flammability Test of Plastic Materials for Instrument Parts" of UL Subject 94 (Underwriters Laboratories Incorporation) (hereinafter referred to as UL 94 vertical burning test), this composition takes a flame-retardant rank of V-0 in a wall thickness of ⅛ inch and V-2 in a wall thickness of 1/32 inch which is the requirement of high flame retardant. In a 5V test of the UL 94 vertical burning test in which higher flame retardance is required, droplets of the above-mentioned composition drop, and melted, cut and burnt pieces of this composition fall (hereinafter these droplets and pieces are referred to as drips, and charcteristics by which the drips are formed are referred to as drip properties). Therefore, the suggested flame-retardant composition can hardly achieve the flame-retardent level of 5V in a wall thickness of ⅛ inch in the UL 94 vertical burning test which is the requirement of high flame retardance. In addition, even if an olefinic synthetic rubber or elastomer which can usually be used for the improvement in impact strength of a polypropylene is added to this kind of composition, impact properties such as Izod impact strength and the like are scarcely improved.

SUMMARY OF THE INVENTION

An object of the present invention is to provide a flame-retardant polypropylene resin composition having a high flame retardance, i.e., a flame retardance of V-0 in a wall thickness of 1/32 inch in the UL94 vertical burning test, giving off neither a corrosive gas nor a poisonous gas when processed and burnt, having excellent moldability, and providing molded products in which mechanical strength is excellent.

Another object of the present invention is to provide a flame-retardant polypropylene resin composition having a flame retardance of 5V in a wall thickness of ⅛ inch in the UL94 vertical burning test, giving off neither a corrosive gas nor a poisonous gas when processed and burnt, having excellent moldability, providing molded products in which mechanical strength is high, and having excellent impact strength.

The first aspect of the present invention is directed to a flame-retardant polypropylene resin composition comprising:

| | | |
|---|---|---|
| (A) | a polyethylene resin | 5 to 25% by weight |
| (B) | polyammonium phosphate or polyammonium phosphate modified by melamine resin | 12 to 25% by weight |
| (C) | a 1,3,5-triazine derivative having the structure represented by the general formula (I) | at least 5% by weight |

-continued

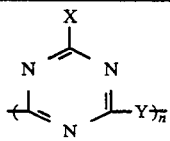
(I)

wherein X is a morpholino group or a piperidino group, Y is a divalent group of piperazine, and n is an integer of 2 to 50, (D) a polypropylene resin — remainder, the total amount of these components (A) to (D) being 100% by weight.

The second aspect of the present invention is directed to a flame-retardant polypropylene resin composition comprising:

| | | |
|---|---|---|
| (A) | a polyethylene resin | 5 to 30% by weight |
| (B) | polyammonium phosphate or polyammonium phosphate modified by melamine resin | 12 to 25% by weight |
| (C) | a 1,3,5-triazine derivative having the structure represented by the general formula (I) | at least 5% by weight |
| | 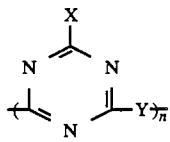 | (I) |
| | wherein X is a morpholino group or a piperidino group, Y is a divalent group of piperazine, and n is an integer of 2 to 50, | |
| (E) | a thiophosphite selected from compounds represented by the general formulae (II), (III), (IV) and (V) | at least 0.05% by weight |
| | 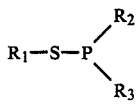 | (II) |
| | 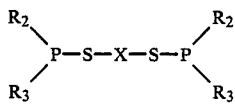 | (III) |
| | 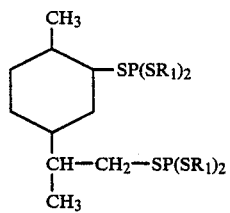 | (IV) |
| | 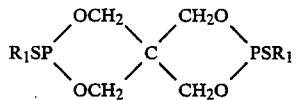 | (V) | wherein $R_1$ is alkyl group having 6 or more carbon atoms, a cycloalkyl group or an aryl group; $R_2$ is $-SR_2'$ or $-R_2'$; $R_3$ is $-SR_3'$ or $-R_3'$; $-R_2'$ and $-R_3'$ are identical or different and each of them is an alkyl group, a cycloalkyl group or an aryl group; X is $-(CH_2)_n-$, $-(CH_2)_n-O-(CH_2)_m-$ or

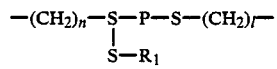

| | | |
|---|---|---|
| | wherein n, m and l are identical or different and they are integers, | |
| (F) | a crosslinking agent | at least 1% by weight |
| (D) | a polypropylene resin | remainder, |
| | the total amount of these components (A) to (F) being 100% by weight. | |
| | The third aspect of the present invention is directed to a flame-retardant polypropylene resin composition comprising the above-mentioned components (A), (B), (C), (D), (E) and (F), and additionally | |
| (G) | and olefinic synthetic rubber or elastomer | 5 to 30% by weight | the amount of the polypropylene resin being partially replaced with the amount of the component (G).

DETAILED DESCRIPTION OF THE INVENTION

Examples of a polypropylene resin used in the present invention include a crystalline propylene homopolymer, crystalline propylene copolymers of 70% by weight or more of propylene and at least one olefin selected from the group consisting of ethylene, butene-1, pentene-1, hexene-1, 4-methyl-pentene-1, heptene-1, octene-1 and decene-1, and mixtures of two or more crystalline propylene polymers. In particular, a crystalline ethylenepropylene block copolymer is preferable.

In the present invention, high-density, medium-density and low-density polyethylenes all are usable as the polyethylene resin, but it is desirable to make use of the high-density polyethylene so as to obtain molded articles having excellent stiffness.

In the composition of the first aspect of the present invention, the blend ratio of the polyethylene resin to the composition is in the range of 5 to 25% by weight, preferably 7 to 20% by weight, more preferably 10 to 20% by weight. When the blend ratio of the polyethylene resin is less than 5% by weight, a flame retardance of V-0 in a wall thickness of 1/32 inch in the UL94 vertical burning test cannot be achieved, and when it is more than 25% by weight, a flame retardnace of V-0 in a wall thickness of 1/32 inch cannot be accomplished, either.

In the second and third aspects of the present invention, the blend ratio of the polyethylene resin to the composition is in the range of 5 to 30% by weight, preferably 7 to 20% by weight, more preferably 10 to 20% by weight. When the blend ratio of the polyethylene resin is less than 5% by weight, a flame retardance of 5V in a wall thickness of ⅛ inch in the UL94 vertical burning test cannot be achieved, and when it is more than 30% by weight, a flame retardance of 5V in a wall thickness of ⅛ inch cannot be accomplished, either.

With regard to polyammonium phosphate or polyammonium phosphate modified by melamine resin used in the present invention, a commercially available one can be directly used. One example of the commercial polyammonium phosphate is SUMISAFE P (trade name; made by Sumitomo Chemical Co., Ltd.), and one example of the commercial polyammonium phosphate modified by melamine resin is SUMISAFE PM (trade name; made by Sumitomo Chemical Co., Ltd.).

In the first aspect of the present invention, polyammonium phosphate or polyammonium phosphate modified by melamine resin is used in a blend ratio of 12 to 25% by weight with respect to the composition. When the blend ratio of this compound is less than 12% by weight, it is impossible to obtain the composition by which a flame retardance of V-0 in a wall thickness of 1/32 inch in the UL94 vertical burning test can be achieved, and when it is more than 25% by weight, the flame retardance cannot be further improved any more and the hygroscopicity of the composition is heightened adversely owing to the function of polyammonium phosphate or polyammonium phosphate modified by melamine resin.

In the second and third aspects of the present invention, polyammonium phosphate or polyammonium phosphate modified by melamine resin is used in a blend ratio of 12 to 25% with respect to the composition. When the blend ratio of this compound is less than 12% by weight, it is impossible to obtain the composition by which a flame retardance of 5V in a wall thickness of ⅛ inch in the UL94 vertical burning test can be achieved, and when it is more than 25% by weight, the flame retardance cannot be further improved any more and the hygroscopicity of the composition is heightened adversely owing to the function of polyammonium phosphate or polyammonium phosphate modified by melamine resin.

Examples of the 1,3,5-triazine derivative used in the present invention include an oligomer or polymer of 2-piperazinylene-4-morpholino-1,3,5-triazine, and an oligomer or polymer of 2-piperazinylene-4-piperidino-1,3,5triazine.

In the composition of the first aspect of the present invention, the blend ratio of the 1,3,5-triazine derivative is in the range of 5 to 10% by weight with respect to the composition. When the blend ratio of this derivative is less than 5% by weight, a high flame retardance of V-0 in a wall thickness of 1/32 inch in the UL94 vertical burning test cannot be achieved, and when it is more than 10% by weight, the flame retardance cannnot be further improved.

In the composition of the second and third aspects of the present invention, the blend ratio of the 1,3,5-triazine derivative is in the range of 5 to 10% by weight with respect to the composition. When the blend ratio is less than 5% by weight, a high flame retardance of 5V in a wall thickness of ⅛ inch in the UL94 vertical burning test cannot be achieved, and when it is more than 10% by weight, the flame retardance cannot be further improved any more.

The above-mentioned oligomer or polymer of 2-piperazinylene-4-morpholino-1,3,5-triazine, which is one of the 1,3,5-triazine derivatives, can be prepared in accordance with, for example, the following procedure: Equimolar amounts of 2,6-dihalo-4-morphlino-1,3,5-triazine (e.g., 2,6-dichloro-4-morpholino-1,3,5-triazine or 2,6-dibromo-4- morpholino-1,3,5-triazine) and piperazine are reacted with each other in an inert solvent such as xylene in the presence of an organic or inorganic base (e.g., triethylamine, tributylamine, sodium hydroxide, potassium hydroxide or sodium carbonate) under heating or preferably at the boiling point of the inert solvent, and after the reaction, the reaction mixture is then filtered to separate and remove the salt of a by-product therefrom. Afterward, the reaction mixture is washed with boiling water, followed by drying, thereby obtaining the desired compound.

Furthermore, the above-mentioned oligomer or polymer of 2-piperazinylene-4-piperidino-1,3,5-triazine can be prepared in accordance with, for example, the following procedure: Equimolar amounts of 2,6-dihalo-4-piperidino-1,3,5-triazine (e.g., 2,6-dichloro-4-piperidino-1,3,5-triazine or 2,6-dibromo-4-piperidino-1,3,5-triazine) and piperazine are reacted with each other in an inert solvent such as triisopropylbenzene in the presence of an organic or inorganic base (e.g., triethylamine, tributylamine, sodium hydroxide, potassium hydroxide or sodium carbonate) under heating or preferably at the boiling point of the inert solvent, and after the reaction, the reaction mixture is then filtered to separate and remove the salt of a byproduct therefrom. Afterward, the reaction mixture is washed with boiling water, followed by drying, thereby obtaining the desired compound.

Examples of the crosslinking agent used in the second and third aspects of the present invention include polyfunctional monomers, oximenitroso compounds and maleimide compounds. Typical examples of the crosslinking agent include triallylisocyanurate, (di)ethylene glycol di(meth)acrylate, trimethylolpropane triacrylate, trimethylolpropane trimethacrylate, trimethylolethylene triacrylate, pentaerythritol triacrylate, pentaerythritol tetraacrylate, divinylbenzene, diallyl phthalate, divinylpyridine, quinone dioxime, benzoquinone dioxime, p-nitrosophenol and N,N'-mphenylene bismaleimide. Of these compounds, polyfunctional (meth)acrylates such as trimethylolpropane tri(meth)acrylate and pentaerythritol triacrylate are preferable.

The blend ratio of the crosslinking agent is in the range of 1 to 15% by weight, preferably 1 to 7% by weight. When the blend ratio of the crosslinking agent is less than 1% by weight, the drip prevention effect at the time of burning can scarecely be perceived, and when it is more than 15% by weight, the drip prevention effect cannot be further improved and greater amounts are, therefore, meaningless and uneconomical.

Examples of the thiophosphites represented by the general formulae (II), (III), (IV) and (V) used in the second and third aspects of the present invention include trilauryl trithiophosphite, tridecyl trithiophosphite, tribenzyl trithiophosphite, tricyclohexyl trithiophosphite, tri(2-ethylhexyl) trithiophosphite, trinaphtyl trithiophosphite, diphenyldecyl trithiophosphite, diphenyllauryl trithiophosphite, tetralauryl-4-oxabutylene-1,7-tetrathiophosphite, tetrakis(mercaptolauryl)-1,6-dimercaptohexylene diphosphite, pentakis(mercaptolauryl)bis(1,6-hexylene-dimercapto) trithiophosphite, tetrakis(mercaptolauryl)-2,9-dimercapto-para-methylene diphosphite, bis-(mercaptolauryl)-1,6-dimercaptohexylene-bis(benzene phosphonite), tetrakis(mercaptolauryl)-2,9-dimercapto-paramethylene diphosphite, dioctyldithiopentaerythritol diphosphite, dilauryldithiopentaerythritol diphosphite, phenyllauryldithiopentaerythritol diphosphite and mixtures of two or more thereof.

The blend ratio of the thiophosphite is in the range of 0.05 to 5% by weight, preferably 0.1 to 2% by weight. When the blend ratio of the thiophosphite is less than 0.05% by weight, the drip prevention effect is insufficient, and when it is more than 5% by weight, the drip prevention effect cannot be further improved and greater amounts are, therefore, meaningless and uneconomical.

Examples of olefinic synthetic rubber or elastomer used in the third aspect of the present invention include ethylene-propylene rubber, ethylene-propylene-diene rubber, ethylene-1-butene rubber, ethylene-vinyl acetate copolymer and polyolefin thermoplastic elastomer. Of these compounds, ethylene-propylene rubber and ethylene-propylene-diene rubber are preferable from the viewpoint of the improvement in impact strength.

The blend ratio of the olefinic synthetic rubber or elastomer is in the range of 5 to 30% by weight, preferably 7 to 20% by weight, more preferably 10 to 20% by weight, with respect to the composition. When this blend ratio is less than 5% by weight, the improvement effect of impact strength is insufficient, and when it is more than 30% by weight, good mechanical strength and heat resistance inherent in the polypropylene are impaired.

To the composition of the present invention, there may be added various additives which can be usually used in the polypropylene resin. Examples of such additives include an antioxidant, an antistatic agent, a lubricant and a pigment.

The flame-retardant polypropylene resin composition of the first aspect of the present invention may be prepared in accordance with, for example, the following method:

That is, predetermined amounts of a polypropylene resin, a polyethylene resin, polyammonium phosphate or polyammonium phosphate modified by melamine resin, a 1,3,5-triazine derivative having the structure represented by the general formula (I) and various additives are placed in a mixer such as a Henschel mixer (trade name), a supermixer or a tumbler mixer. Afterward, they are stirred and mixed for 1 to 10 minutes, and the resulting mixture is then melted and kneaded at a melt kneading temperature of 170° to 220° C. by means of rolls or an extruder, followed by pelletizing, thereby obtaining the desired product.

Each flame-retardant polypropylene resin composition of the second and third aspects of the present invention may be prepared in accordance with, for example, the following method:

That is, predetermined amounts of a polypropylene resin, a polyethylene resin, or a polyethylene resin and an olefinic synthetic rubber or elastomer, polyammonium phosphate or polyammonium phosphate modified by melamine resin, a 1,3,5-triazine derivative having the structure represented by the general formula (I), a crosslinking agent, a thiophosphite selected from compounds represented by the general formulae (II), (III), (IV) and (V) and various additives are placed in a mixer such as a Henschel mixer (trade name), a supermixer or a tumbler mixer. Afterward, they are stirred and mixed for 1 to 10 minutes, and the resulting mixture is then melted and kneaded at a melt kneading temperature of 170° to 220° C. by means of rolls or an extruder, followed by pelletizing, thereby obtaining the desired product.

Our invention has provided a flame-retardant polypropylene resin composition having a high flame retardance, i.e. a flame retardance of V-0 in a wall thickness of 1/32 inch in the UL94 vertical burning test, giving off neither a corrosive gas nor a poisonous gas when processed and burnt, having excellent moldability, and providing molded products in which mechanical strength is excellent.

Our invention has also provided a flame-retardant polypropylene resin composition having a flame retardance of 5V in a wall thickness of ⅛ inch in the UL94 vertical burning test, giving off meither a corrosive gas nor a poisonous gas when processed and burnt, having excellent moldability, providing molded products in which mechanical strength is high and having excellent impact strength.

EXAMPLES

The, present invention will be described in detail in reference to examples and comparative examples, but it should not be limited to these examples. In the examples and comparative examples, some performances were evaluated by the following procedures:

(1) Flame retardance:

The flame retardance was evaluated in accordance with a vertical burning test (wall thickness of specimens was 1/32 inch) in "Flammability Test of Plastic Materials for Instrument Parts" of UL Subject 94 (Underwriters Laboratories Incorporation) and in accordance with the "A" method of Vertical Burning Test for classifying Materials 94-5V (wall thickness of specimens was ⅛ inch).

(2) Flexural modulus:

The flexural modulus was evaluated in accordance with JIS K 7203.

(3) Izod impact strength:

The Izod impact strength was evaluated in accordance with JIS K 7110.

Example 1 and Comparative Example 1

In a Henschel mixer (trade name) were place 6.3 kg of crystalline ethylene-propylene block copolymer, as a polypropylene resin, in which the a ethylene content was 8.5% by weight and a melt flow rate (the discharge amount of the melted resin at a temperature of 230° C. for 10 minutes when a load of 2.16 kg was applied) was 20 g/10 minutes, 700 g of ethylene homopolymer [Chissopolyethy (trade name) M680, made by Chisso Co., Ltd.] having a melt index (the discharge amount of the melted resin at a temperature of 190° C. for 10 minutes when a load of 2.16 kg was applied) of 6.5 g/10 minutes as a polyethylene resin, 2.1 kg of polyammonium phosphate [SUMISAFE P (trade name), made by Sumitomo Chemical Co., Ltd.], 800 g of 2-piperazinylene-4-morpholino-1,3,5-triazine polymer (n=11, molecular weight=about 2,770) as a 1,3,5-triazine derivative, and 15 g of 2,6-di-t-butyl-p-cresol, 20 g of di-myristyl-$\beta,\beta$-thiodipropionate and 10 g of calcium stearate as additives, and they were then stirred and mixed for 3 minutes. Afterward, the resulting mixture was melted, kneaded and extruded at a melt kneading temperature of 200° C. by means of an extruder having a bore diameter of 45 mm in order to form pellets.

Furthermore, in Comparative Example 1, the same components as in Example 1 were placed in the Henschel mixer (trade name) in the same blend ratio as in Example 1 with the exception that any polyethylene resin was not used, and stirring/mixing and melting/kneading/extruding were done as in Example 1, in order to obtain pellets.

Afterward, the pellets obtained in the example and the comparative example were dried at a temperature of 100° C. for 3 hours, and specimens for a flame retardance test, a flexural modulus test and an Izod impact strength test were then molded from the pellets by the use of an injection molding machine in which the maximum temperature of a cylinder was set to 220° C. The specimens were next used to measure flame retardance, flexural modulus and Izod impact strength. The results are set forth in Table 1.

Examples 2 to 4 and Comparative Examples 2 to 4

The same components as in Example 1 were placed in a Henschel mixer (trade name) in the same ratio as in Example 1 with the exception that the polypropylene resin and the polyethylene resin were used in a blend ratio shown in Table 1, and stirring/mixing and melting/kneading/extruding were done as in Example 1, in order to obtain pellets.

Furthermore, in Comparative Examples 2 to 4, the same components as in Example 1 were placed in the Henschel mixer (trade name) in comformity with Example 1 with the exception that the polyethylene resin, polyammonium phosphate, the 1,3,5-triazine derivative and the polypropylene resin were used in blend ratios shown in Table 1, and stirring/mixing and melting/kneading/extruding were done as in Example 1, in order to obtain pellets.

Afterward, specimens for flame retardance evaluation were prepared from the pellets obtained in these examples and comparative examples by the same procedure as in Example 1, and flame retardance was then evaluated. The results are set forth in Table 1.

Example 5

The same components as in Example 1 were placed in a Henschel mixer (trade name) in the same blend ratio as in Example 1 with the exception that 2-piperazinylene-4-piperidino-1,3,5-triazine polymer (n=11; molecular weight =about 2,800) was used as the 1,3,5-triazine derivative, and stirring/mixing and melting/mixing/extruding were done in order to obtain pellets. Specimens for flame retardance evaluation were prepared from the thus obtained pellets in the same manner as in Example 1, and the flame retardance was then evaluated. The results are set forth in Table 1.

Example 6 and Comparative Examples 5 and 6

In a Henschel mixer (trade name) were placed 51% by weight of crystalline ethylene-propylene block copolymer, as a polypropylene resin, in which an ethylene content was 8.5% by weight and a melt flow rate (the discharge amount of the melted resin at a temperature of 230° C. for 10 minutes when a load of 2.16 kg was applied) was 20 g/10 minutes, 15% by weight of ethylene homopolymer [Chissopolyethy (trade mark) M680, made by Chisso Co., Ltd.]having a melt index (the discharge amount of the melted resin at a temperature of 190° C. for 10 minutes when a load of 2.16 kg was applied) of 6.5 g/10 minutes as the polyethylene resin of the component (A), 21% by weight of polyammonium phosphate [SUMISAFE P (trade name), made by Sumitomo Chemical Co., Ltd.]as the component (B), 8% by weight of 2-piperazinylene-4-morpholino-1,3,5-triazine polymer (n=11, molecular weight=about 2,770) as the 1,3,5-triazine derivative of the component (C), 3% by weight of trimethylolpropane triacrylate as the crosslinking agent of the component (F), 0.5% by weight of trilauryl trithiophosphite as the thiophosphite of the component (E), and 0.15% by weight of 2,6-di-t-butyl-p-cresol, 0.2% by weight of di-myristyl-$\beta,\beta$-thiodipropionate and 0.1% by weight of calcium stearate as additives, and they were then stirred and mixed for 3 minutes. Afterward, the resulting mixture was melted, kneaded and extruded at a melt kneading temperature of 200° C. by means of an extruder having a bore diametrr of 45 mm in order to form pellets.

Furthermore, in Comparative Examples 5 and 6, the same components as in Example 6 were placed in the Henschel mixer (trade name) in the same blend ratio as in Example 6 with the exception that any polyethylene resin was not used in Comparative Example 5 and that neither trimethylolpropane triacrylate of the component (F) nor trilauryl thiophosphite of the component (E) was used in comparative Example 6, and stirring-/mixing and melting/kneading/extruding were then done as in Example 6, in order to obtain pellets.

Afterward, the pellets obtained in these examples and comparative examples were dried at a temperature of 100° C. for 3 hours, and specimens for a flame retardance test, a flexural modulus test and an Izod impact strength test were then molded from the pellets by the use of an injection molding machine in which the maximum temperature of a cylinder was set to 220° C. The specimens were next used to measure flame retardance, flexural modulus and Izod impact strength. The results are set forth in Table 2.

Example 7 to 10 and Comparative Examples 7 and 8

The same components as in Example 6 were placed in a Henschel mixer (trade name) in the same ratio as in Example 6 with the exception that the polypropylene resin, the polyethylene resin, trimethylolpropane triacrylate and trilauryl trithiophosphite were used in blend ratios shown in Table 2, and stirring/mixing and melting/kneading/extruding were done as in Example 6, in order to obtain pellets.

Afterward, specimens for flame retardance evaluation were prepared from the pellets obtained in these examples and comparative examples by the same procedure as in Example 6, and flame retardance was evaluated. The results are set forth in Table 2.

Example 11

The same components as in Example 6 were placed in a Henschel mixer (trade name) in the same blend ratio as in Example 6 with the exception that 2-piperazinylene-4-piperidino-1,3,5-triazine polymer (n=11, molecular weight =about 2,800) was used as the 1,3,5-triazine derivative of the component (C), and stirring/mixing and melting/mixing/extruding were then done as in Example 6 in order to obtain pellets. Specimens for flame retardance evaluation were prepared from the thus obtained pellets in the same manner as in Example 6, and the flame retardance was then evaluated. The results are set forth in Table 2.

Examples 12 to 14 and Comparative Examples 9 to 17

In a Henschel mixer (trade name) were placed crystalline ethylene-propylene block copolymer, as the polypropylene resin of the component (D), in which an ethylene content was 85.% by weight and a melt flow rate was 20 g/10 minutes, ethylene homopolymer [Chissopolyethy (trade mark) M680, made by Chisso Co., Ltd.] having a melt index of 6.5 g/10 minutes as the polyethylene resin of the component (A), an ethylene-propylene rubber [JSR EP (trade mark) 02P, made by Japan Synthetic Rubber Co., Ltd.] as the olefinic synthetic rubber or elastomer of the component (G), trimethylolpropane triacrylate as the component (F) and trilauryl trithiophosphite as the component (E) in ratios shown in Table 3. Furthermore, there were added thereto 21% by weight of polyammonium phosphate [SUMISAFE P (trade name), made by Sumitomo Chemical Co., Ltd.] as the component (B), 8% by weight of 2-piperazinylene-4-morpholino-1,3,5-triazine polymer (n=11, molecular weight=about 2,770) as the 1,3,5-triazine derivative of the component (C), and 0.15% by weight of 2,6-di-t-butyl-p-cresol, 0.2% by weight of di-myristyl-$\beta,\beta$-thriodipropionate and 0.1% by weight of calcium stearate as additives, and they were then stirred and mixed for 3 minutes. Afterward, the resulting mixture was melted, kneaded and extruded at a melt kneading temperature of 200° C. by means of an extruder having a bore diameter of 45 mm in order to form pellets.

The pellets obtained in the respective examples and comparative examples were dried at a temperature of 100° C. for 3 hours, and specimens for a flame retardance test and an Izod impact strength test were then molded from the pellets by the use of an injection molding machine in which the maximum temperature of a cylinder was set to 220° C. The specimens were used to measure flame retardance and Izod impact strength. The results are set forth in Table 3.

TABLE 1

|  | Component (A) wt % | Component (B) wt % | Component (C) wt % | Component (D) wt % | Flame Retardance | Flexural Modulus × $10^4$ kg/cm$^2$ | Izod IMPACT Strength kg · cm/cm |
|---|---|---|---|---|---|---|---|
| Example 1 | 7 | 21 | C1 8 | 64 | V-0 | 1.80 | 2.9 |
| Comp. Ex. 1 | 0 | 21 | C1 8 | 71 | V-2 | 1.68 | 2.9 |
| Example 2 | 5 | 21 | C1 8 | 66 | V-0 |  |  |
| Example 3 | 12 | 21 | C1 8 | 59 | V-0 |  |  |
| Example 4 | 25 | 21 | C1 8 | 46 | V-0 |  |  |
| Comp. Ex. 2 | 30 | 21 | C1 8 | 41 | V-2 |  |  |
| Comp. Ex. 3 | 10 | 10 | C1 10 | 70 | *1 |  |  |
| Comp. Ex. 4 | 10 | 22 | C1 3 | 65 | *1 |  |  |
| Example 5 | 7 | 21 | C2 8 | 64 | V-0 |  |  |

Component (A): Polyethylene resin (Chisso Co., Ltd., M680, melt index = 6.5 g/10 min)
Component (B): Polyammonium phosphate
Component (C): 1,3,5-Triazine derivative
C1 was a polymer (n = 11) of 2-piperazinylene-4-morpholino-1,3,5-triazine.
C2 was a polymer (n = 11) of 2-piperazinylene-4-piperidino-1,3,5-triazine.
Component (D): Ethylene-propylene block copolymer (ethylene content = 8.5 wt %; melt flow rate = 20 g/10 min) as polypropylene resin
*1: Specimens were burnt, and flame retardance was not evaluated.

TABLE 2

|  | Component (A) wt % | Component (B) wt % | Component (C) wt % | Component (F) wt % | Component (E) wt % | Component (D) wt % | Flame Retardance | Flexural Modulus kg/cm² | Izod Impact Strength kg·cm/cm |
|---|---|---|---|---|---|---|---|---|---|
| Example 6 | 15 | 21 | C1 8 | 3 | 0.5 | 51 | 5V | 16100 | 3.3 |
| Comp. Ex. 5 | 0 | 21 | C1 8 | 3 | 0.5 | 66 | *1 | 16500 | 3.0 |
| Comp. Ex. 6 | 15 | 21 | C1 8 | 0 | 0 | 55 | *1 | 17900 | 2.8 |
| Example 7 | 5 | 21 | C1 8 | 3 | 0.5 | 61 | 5V | | |
| Example 8 | 10 | 21 | C1 8 | 3 | 0.5 | 56 | 5V | | |
| Example 9 | 30 | 21 | C1 8 | 3 | 0.5 | 36 | 5V | | |
| Comp. Ex. 7 | 40 | 21 | C1 8 | 3 | 0.5 | 26 | *1 | | |
| Comp. Ex. 8 | 20 | 21 | C1 8 | 0.5 | 0.5 | 49 | *1 | | |
| Example 10 | 20 | 21 | C1 8 | 1 | 0.5 | 50 | 5V | | |
| Example 11 | 15 | 21 | C2 8 | 3 | 0.5 | 51 | 5V | | |

Component (A): Polyethylene resin (Chisso Co., Ltd., M680, melt index = 6.5 g/10 min)
Component (B): Polyammonium phosphate
Component (C): 1,3,5-Triazine derivative
C1 was a polymer (n = 11) of 2-piperazinylene-4-morpholino-1,3,5-triazine.
C2 was a polymer (n = 11) of 2-piperazinylene-4-piperidino-1,3,5-triazine.
Component (F): Trimethylolpropane triacrylate
Component (E): Trilauryltrithiophosphite
Component (D): Ethylene-propylene block copolymer (ethylene content = 8.5 wt %; melt flow rate = 20 g/10 min) as polypropylene resin
*1: The flame retardance did not fall under the rank of "5V".

TABLE 3

|  | Component (A) wt % | Component (G) wt % | Component (F) wt % | Component (E) wt % | Flame Retardance | Izod Impact Strength kg·cm/cm |
|---|---|---|---|---|---|---|
| Example 12 | 10 | 15 | 3.0 | 0.5 | 5V | 21.5 |
| Example 13 | 15 | 15 | 3.0 | 0.5 | 5V | 22.4 |
| Example 14 | 20 | 15 | 3.0 | 0.5 | 5V | 22.4 |
| Comp. Ex. 9 | 0 | 5 | 0 | 0 | *1 | 3.0 |
| Comp. Ex. 10 | 0 | 12 | 0 | 0 | *1 | 3.0 |
| Comp. Ex. 11 | 0 | 20 | 0 | 0 | *1 | 4.3 |
| Comp. Ex. 12 | 0 | 10 | 3.0 | 0.5 | *1 | 4.4 |
| Comp. Ex. 13 | 0 | 15 | 3.0 | 0.5 | *1 | 8.8 |
| Comp. Ex. 14 | 0 | 20 | 3.0 | 0.5 | *1 | 14.4 |
| Comp. Ex. 15 | 10 | 0 | 3.0 | 0.5 | 5V | 2.8 |
| Comp. Ex. 16 | 15 | 0 | 3.0 | 0.5 | 5V | 3.3 |
| Comp. Ex. 17 | 20 | 0 | 3.0 | 0.5 | 5V | 3.5 |

Component (G): Etylene-propylene rubber (EP 02P, Japan Synthetic Rubber Co., Ltd.)
*1: The flame retardance did not fall under the rank of "5V".

What is claimed is:

1. A flame-retardant polypropylene resin composition which provides a flame retardance in an UL-94 vertical burning test of V-0 for a material having a wall thickness of 1/32 inch comprising:

| (A) | a polyethylene resin | 5 to 25% by weight |
|---|---|---|
| (B) | polyammonium phosphate or polyammonium phosphate modified by melamine resin | 12 to 25% by weight |
| (C) | a 1,3,5-triazine derivative having the structure represented by the general formula (I) | at least 5% by weight |

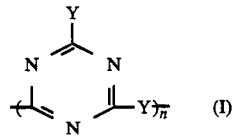

wherein X is a morpholino group or a piperidino group, Y is a divalent group of piperazine, and n is an integer of 2 to 50, (D) a polypropylene resin remainder,
the total amount of these components (A) to (D) being 100% by weight.

2. A flame-retardant polypropylene resin composition according to claim 1 wherein said polypropylene resin is one or a mixture of two or more of a crystalline propylene homopolymer, or crystalline copolymers each of which is composed of the propylene main component and at least one olefin selected from the group consisting of ethylene, butene-1, pentene-1, hexene-1, 4-methylpentene-1, heptene-1, octene-1 and decene-1.

3. A flame-retardant polypropylene resin composition which provides flame retardance in an UL-94 vertical burning test of 5V for a material having a wall thickness of ⅛ inch comprising:

| (A) | a polyethylene resin | 5 to 30% by weight |
|---|---|---|
| (B) | polyammonium phosphate or polyammonium phosphate modified by melamine resin | 12 to 25% by weight |
| (C) | a 1,3,5-triazine derivative having the structure represented by the general formula (I) | at least 5% by weight |

| | |
|---|---|
| 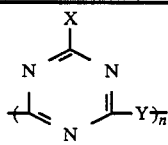<br>wherein X is a morpholino group or a piperidino group, Y is a divalent group of piperazine, and n is an integer of 2 to 50, | (I) |
| (E) a thiophosphite selected from compounds represented by the general formulae (II), (III), (IV) and (V) | at least 0.05% by weight |
| 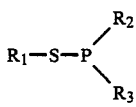 | (II) |
| 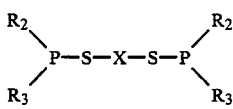 | (III) |
| 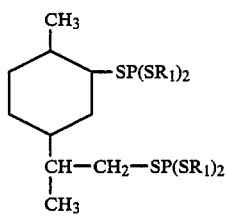 | (IV) |
| 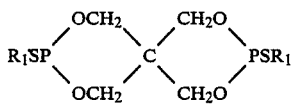 | (V) |
| wherein $R_1$ is an alkyl group having 6 or more carbon atoms, a cycloalkyl group or an aryl group; $R_2$ is $-SR_2'$ or $-R_2'$; $R_3$ is $-SR_3'$ or $-R_3'$; $-R_2'$ and $-R_3'$ are identical or different and each of them is an alkyl group, a cycloalkyl group or and aryl group; X is $-(CH_2)_n-$, $-(CH_2)_n-O-(CH_2)_m-$ or<br>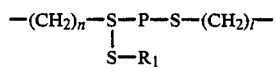<br>wherein n, m and l are identical or different and they are integers of 2 to 6, | |
| (F) a crosslinking agent | at least 1% by weight |
| (D) a polypropylene resin | remainder, | the total amount of these components (A) to (F) being 100% by weight.

4. A flame-retardant polypropylene resin composition according to claim 3 comprising the above-mentioned components (A), (B), (C), (D), (E) and (F), and additionally (G) an olefinic synthetic rubber or elastomer 5 to 30% by weight the amount of said polypropylene resin being partially replaced with the amount of said component (G).

5. A flame-retardant polypropylene resin composition according to claim 3 wherein said polypropylene resin is one or a mixture of two or more of a crystalline propylene homopolymer, or crystalline copolymers each of which is composed of 70% by weight or more of propylene and at least one selected from the group consisting of ethylene, butene-1, pentene-1, hexene-1, 4-methylpentene-1, heptene-1, octene-1 and decene-1.

6. A flame-retardant polypropylene resin composition according to claim 4 wherein said polypropylene resin is one or a mixture of two or more of a crystalline propylene homopolymer, or crystalline copolymers each of which is composed of 70% by weight or more of propylene and at least one selected from the group consisting of ethylene, butene-1, pentene-1, hexene-1, 4-methylpentene-1, heptene-1, octene-1 and decene-1.

7. A flame-retardant polypropylene composition according to claim 1 wherein said 1,3,5-triazine derivative is present in an amount of not more than 10% by weight.

8. A flame-retardant polypropylene composition according to claim 3 wherein said 1,3,5-triazine derivative is present in an amount of not more than 10% by weight.

9. A flame-retardant polypropylene composition according to claim 4 wherein said 1,3,5-triazine derivative is present in an amount of not more than 10% by weight.

10. A flame-retardant polypropylene composition according to claim 1 wherein said 1,3,5 triazine derivative is an oligomer or a polymer of 2-piperazinylene-4-morpholino-1,3,5,-triazine.

11. A flame-retardant polypropylene composition according to claim 3 wherein said 1,3,5, triazine derivative is an oligomer or a polymer of 2-piperazinylene-4-morpholino-1,3,5,-triazine.

12. A flame-retardant polypropylene composition according to claim 4 wherein said 1,3,5 triazine derivative is an oligomer or a polymer of 2-piperazinylene-4-morpholino-1,3,5,-triazine.

13. A flame-retardant polypropylene composition according to claim 3 wherein said crosslinking agent is a polyfunctional monomer, an oximenitroso compound or a maleimide compound.

14. A flame-retardant polypropylene composition according to claim 4 wherein said crosslinking agent is a polyfunctional monomer, an oximenitroso compound or a maleimide compound.

15. A flame-retardant polypropylene composition according to claim 3 wherein said crosslinking agent is present in an amount of not more than 15% by weight.

16. A flame-retardant polypropylene composition according to claim 4 wherein said crosslinking agent is present in an amount of not more than 15% by weight.

17. A flame-retardant polypropylene composition according to claim 3 wherein said thiophosphate is present in an amount of not more than 5% by weight.

18. A flame-retardant polypropylene composition according to claim 4 wherein said thiophosphate is present in an amount of not more than 5% by weight.

* * * * *

UNITED STATES PATENT AND TRADEMARK OFFICE
CERTIFICATE OF CORRECTION

PATENT NO. : 4,966,931

DATED : October 30, 1990

INVENTOR(S) : Akitaya et al.

It is certified that error appears in the above-identified patent and that said Letters Patent is hereby corrected as shown below:

Column 13, line 55, change

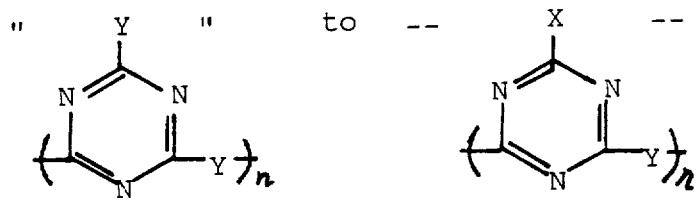

Signed and Sealed this

Twenty-eighth Day of July, 1992

*Attest:*

DOUGLAS B. COMER

*Attesting Officer*     *Acting Commissioner of Patents and Trademarks*